(12) United States Patent
Schlüter

(10) Patent No.: US 8,117,838 B2
(45) Date of Patent: Feb. 21, 2012

(54) MASTER BRAKE CYLINDER ARRANGEMENT OF A MOTOR VEHICLE BRAKE SYSTEM

(75) Inventor: Peter Schlüter, Kammerforst (DE); Frank Schlüter, legal representative, Boppard (DE); Alexander Schlüter, legal representative, Kammerforst (DE); Stefan Schlüter, legal representative, Kammerforst (DE); Irina Gerdt, legal representative, Kammerforst (DE)

(73) Assignee: Lucas Automotive GmbH, Koblenz (DE)

( * ) Notice: Subject to any disclaimer, the term of this patent is extended or adjusted under 35 U.S.C. 154(b) by 760 days.

(21) Appl. No.: 12/264,631

(22) Filed: Nov. 4, 2008

(65) Prior Publication Data

US 2009/0179484 A1    Jul. 16, 2009

(30) Foreign Application Priority Data

Nov. 6, 2007    (DE) .......................... 10 2007 052 844

(51) Int. Cl.
*B60T 11/20* (2006.01)
*B60T 13/14* (2006.01)
(52) U.S. Cl. .......................................... 60/568; 92/128

(58) Field of Classification Search .................... 60/568; 92/128; 303/14
See application file for complete search history.

(56) References Cited

U.S. PATENT DOCUMENTS

| | | | | |
|---|---|---|---|---|
| 5,168,790 A | * | 12/1992 | Konishi | 91/368 |
| 7,861,522 B2 | * | 1/2011 | Obata et al. | 60/545 |

FOREIGN PATENT DOCUMENTS

| | | | |
|---|---|---|---|
| DE | 102006012223 | * | 10/2007 |
| DE | 102006012223 B3 | | 10/2007 |

* cited by examiner

*Primary Examiner* — Thomas E Lazo
(74) *Attorney, Agent, or Firm* — MacMillan, Sobanski & Todd, LLC

(57) ABSTRACT

The invention relates to a master brake cylinder arrangement of a motor vehicle brake system with a master brake cylinder housing, a transmission piston disposed in a displaceable manner in the master brake cylinder housing, and a force input member which can be workingly coupled to the transmission piston in order to introduce a braking force. According to the invention, in order to simplify assembly and to reduce the required construction space, an adapter is coupled to the master brake cylinder housing, to which adapter a contact sleeve is fitted, the force input member being supported at the contact sleeve in a non-actuated starting position.

12 Claims, 3 Drawing Sheets

MASTER BRAKE CYLINDER ARRANGEMENT OF A MOTOR VEHICLE BRAKE SYSTEM

CROSS-REFERENCE TO RELATED APPLICATIONS

This application claims priority to German Patent Application No. 10 2007 052 844.4 filed Nov. 6, 2007, the disclosures of which are incorporated herein by reference in entirety.

BACKGROUND OF THE INVENTION

The present invention relates to a master brake cylinder arrangement of a motor vehicle brake system with a master brake cylinder housing, a transmission piston disposed in a displaceable manner in the master brake cylinder housing, and a force input member which can be workingly coupled to the transmission piston in order to introduce a braking force.

A master brake cylinder arrangement of this kind is known from the prior art. Thus the document DE 10 2006 012 223 B3, for example, presents a master brake cylinder arrangement of this kind, in the case of which two brake pistons disposed in parallel can be actuated via a force input member and a transmission piston arrangement disposed in between in order to generate a brake pressure. In order to introduce the actuating force generated via a brake pedal, a piston arrangement of a relatively complex configuration is provided which, apart from introducing and transmitting the actuating force, additionally also provides a pedal counterforce simulator function. Although this master brake cylinder arrangement from the prior art has many advantages, one disadvantage lies in the fact that the transmission piston arrangement and the components accommodating this are of a construction which, relatively speaking, is complicated and requires a lot of space.

BRIEF SUMMARY OF THE INVENTION

In contrast, a feature of the present invention is to provide a structurally simpler and more space-saving configuration of the master brake cylinder arrangement in the region of the entering force input member and the transmission piston arrangement coupled to the latter.

This feature is achieved with a master brake cylinder arrangement of the type initially described in which an adapter is coupled to the master brake cylinder housing, to which adapter a contact sleeve is fitted, the force input member being supported at the contact sleeve in a non-actuated starting position.

Through the use of an adapter which is coupled to a contact sleeve, it is possible to make the overall arrangement more compact and to provide additional functions. The contact sleeve can thus be used as a stop for the force input member when the master brake cylinder arrangement is in a non-actuated position, as will also be illustrated in detail in the following. Moreover, the contact sleeve can serve to fit bellows, so that the master brake cylinder arrangement can be shorter overall. Finally, this solution also enables manufacturing and assembly tolerances to be better compensated, as will also be illustrated in the following.

According to one development of the invention, the adapter can be positioned via a positioning portion in a predetermined desired position relative to the master brake cylinder housing. As a result of this measure, the adapter is positioned relative to the master brake cylinder housing during assembly, so that incorrect positions can be avoided. A sealing element can optionally also be provided in the positioning portion in order to create a sealing bond.

It is also possible according to the invention for the adapter to have a stepped sleeve extension with an abutment shoulder which can be brought into engagement with a correspondingly formed abutment collar on the contact sleeve. It is in this way possible to couple the contact sleeve to the adapter in a predefined position and location in a stable manner. Furthermore, it is possible in this connection for the contact sleeve to be in abutment via an elongate cylindrical portion with a corresponding cylindrical portion at the sleeve extension of the adapter and thus be secured against tilting.

In order to damp impact noises occurring during operation, one development of the invention can provide for the disposal of a damping element between the abutment shoulder and the abutment collar. As already indicated above and will also be discussed in detail in the following, the force input member is applied to the contact sleeve during operation while the master brake cylinder arrangement takes up a non-actuated position. This can result in undesirable abutment noises, which are damped by the damping element.

According to one development of the invention, the contact sleeve has a contact collar which offers a stop face for the force input member in the non-actuated starting position. As already indicated above, this contact collar serves to create a defined abutment face for the force input member when this returns to its starting position on account of the occurring restoring forces. It is in this connection possible for the contact collar to be embraced by a, preferably elastomeric, stop bead. Impact noises can also be damped by this means. The stop bead can be part of the bellows which are fitted to the contact collar and surround the force input member in a conventional manner.

Generally speaking, it is possible for the force input member to be formed with a stop formation which can interact with the contact collar. However, according to a preferred constructional variant of the invention, a stop sleeve with a stop collar is fitted to the force input member. The force input member can as a result be produced more easily. Furthermore, this constructional variant offers the advantage of enabling manufacturing and assembly tolerances to be better compensated. It is thus possible, according to the invention, for the stop sleeve to be fitted to the force input member with radial or/and axial play. Even if the force input member is not inserted in the master brake cylinder arrangement in alignment with the longitudinal axis of the latter when assembled and by being fitted to the brake pedal, tolerances of this kind can be compensated by the stop sleeve mounted in a floating manner with radial or/and axial play, so that the stop sleeve still comes into defined abutment with the contact collar, even if the stop sleeve and the force input member are not disposed coaxially with one another. It is in this connection possible for the radial or/and axial play to be dimensioned such that a tolerance-induced or assembly-induced oblique position of the force input member can be compensated. The radial or/and axial play is preferably dimensioned such that a skew position of up to 5°, which is caused by component and/or positional tolerances, can be compensated.

According to one development of the invention, in order to enable a floating mounting of this kind of the stop sleeve relative to the force input member to be achieved, the force input member has a shoulder and a stop ring, between which the stop sleeve is accommodated. The shoulder can be formed integrally on the force input member. However the stop ring can be formed as a separate part which lies snugly on the force input member and is optionally axially secured against displacement by a retaining ring which is fitted to the force input member.

According to one development of the invention, in order to facilitate assembly of the master brake cylinder arrangement according to the invention, in particular in order to be able to introduce the force input member into the transmission piston more easily, the transmission piston has a receiving opening which is of conical formation at least in portions and into which a free end of the force input member projects. The conical faces serve as lead-in slopes for the force input member and prevent faulty assembly.

Finally, according to one development of the invention, the transmission piston extends through a pedal counterforce simulation chamber which is formed in the master brake cylinder housing and is guided in this chamber in a sealing manner.

Other advantages of this invention will become apparent to those skilled in the art from the following detailed description of the preferred embodiments, when read in light of the accompanying drawings.

DETAILED DESCRIPTION OF THE INVENTION

Figure 1:
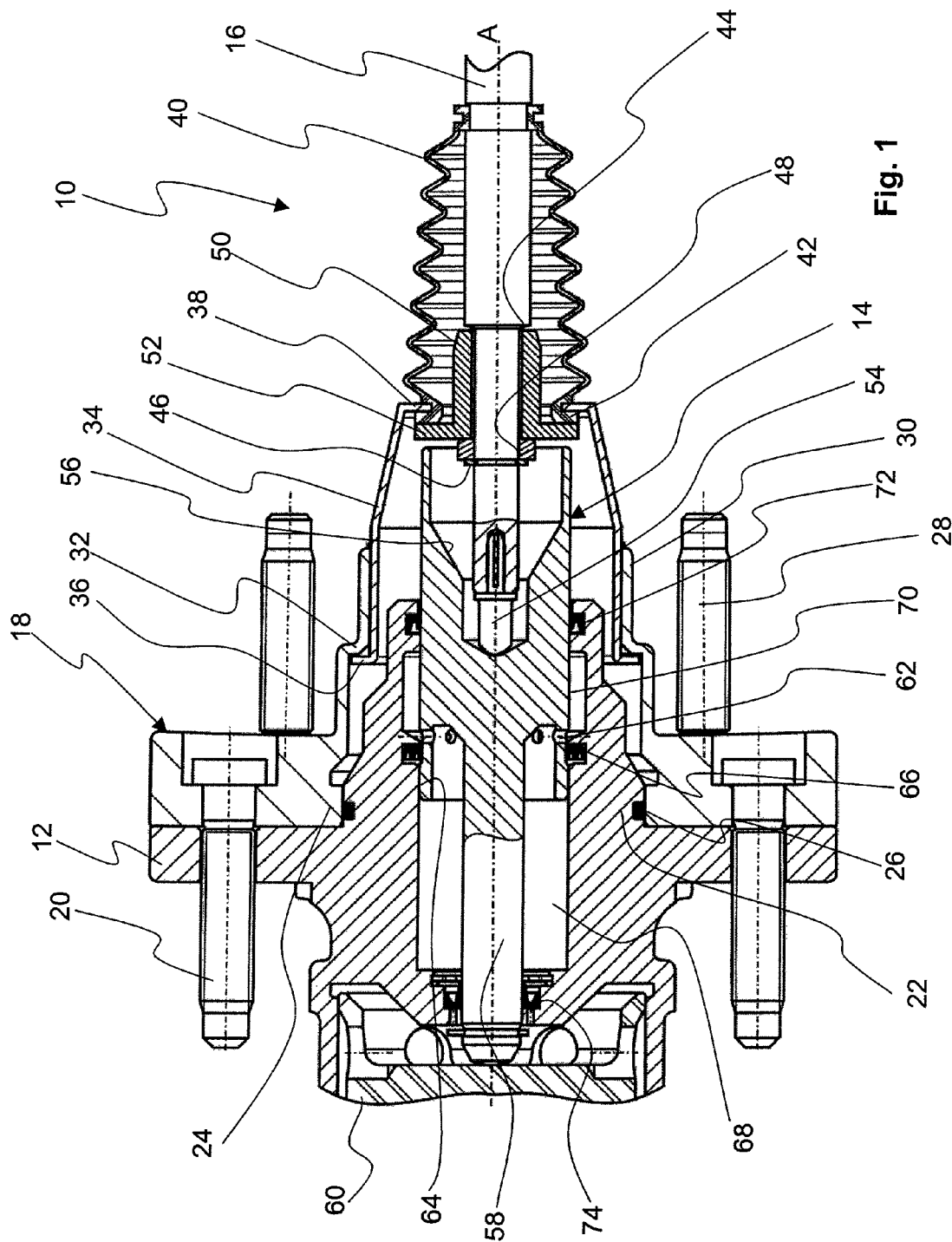
FIG. 1 is an axis-containing partial longitudinal sectional view of a master brake cylinder according to the invention according to a first embodiment.

A first embodiment of a master brake cylinder arrangement according to the invention is shown in FIG. 1 in an axis-containing longitudinal section and generally marked by 10. The master brake cylinder arrangement 10 comprises a master brake cylinder housing 12, in which a transmission piston 14 is accommodated so as to be displaceable along a longitudinal axis A. A force input member 16 is connected to the transmission piston 14 for joint movement along the longitudinal axis A. The force input member 16 is coupled at its right-hand end, which is not shown in FIG. 1, to a brake pedal which can be actuated by a driver in the usual way in order to generate a braking force. An adapter 18 is connected to the master brake cylinder housing 12 via fastening bolts 20. In order to create a defined desired relative position between the master brake cylinder housing 12 and the adapter 18, the master brake cylinder housing 12 is provided with a positioning portion 22 with a defined cylindrical outer surface which interacts with a corresponding positioning portion 24 with a corresponding cylindrical inner surface. An all-round ring seal 26 is fitted in the positioning portion 22, which seal effects mutual sealing between the master brake cylinder housing 12 and the adapter 18.

Tie bolts 28 are fitted to the adapter 18, with which bolts the entire arrangement can be fitted to the firewall of the motor vehicle.

As is immediately obvious in FIG. 1, a stepped sleeve extension 30 is provided on the adapter 18. This has an abutment shoulder 32. A contact sleeve 34 is accommodated in the sleeve extension 30, which sleeve has an abutment collar 36 which projects radially outwards at its end which is on the left in FIG. 1. The abutment collar 36 lies with a positive fit against the abutment shoulder 32. The contact sleeve 34 is also held on the adapter 18 in a stable position via cylindrical portions, extending in parallel, of the contact sleeve 34 and the sleeve extension 30. For this purpose the contact sleeve 34 can also be pressed into the sleeve extension 30, so that it is possible to inhibit a movement of these components relative to one another when braking upon actuating the force input member. Starting from its cylindrical portion, the contact sleeve 34 extends with a conical portion up to its end which is on the right-hand side in FIG. 1. At this right-hand end the contact sleeve has a contact collar 38 which extends radially inwards. The contact collar 38 serves to fit a fastening portion of bellows 40, the bellows 40 being fitted with its end which is on the right-hand side in FIG. 1 in a corresponding receiving groove at the force input member 16. An elastomeric stop bead 42, which is formed in one piece with the bellows 40, extends around the contact collar 38.

FIG. 1 also shows that a shoulder 44 is provided on the force input member 16, as is an all-round recess, in which a retaining ring 46 is fitted. The retaining ring 46 serves to secure a stop ring 48, which is disposed substantially without radial play, axially to the left in FIG. 1 to the force input member. A stop sleeve 50, which has a stop collar 52, is provided between the shoulder 44 and the axially secured stop ring 48. The stop collar 52 serves, in the starting position shown in FIG. 1, in which the transmission piston 14 is pushed to the right in FIG. 1 on account of restoring forces, to hold the entire arrangement in a defined starting position, in which the stop collar 52 lies against the stop bead 42 and therefore the force input member 16 is supported at the contact sleeve 34 and via this at the adapter 18 and, finally, at the master brake cylinder housing 12.

As is immediately obvious in FIG. 1, the stop sleeve 50 is accommodated with axial and radial play between the shoulder 44 and the stop ring 42 on the force input member 16. It is as a result possible for the stop sleeve 50 to lie snugly and flatly with its stop collar 52 against the stop bead 42, although the force input member 16 is not necessarily in alignment with the longitudinal axis A of the master brake cylinder arrangement. A situation of this kind can result, for example, on account of positional tolerances or manufacturing tolerances. It is thus possible for the force input member to be inclined at a tilting angle of up to 5° relative to the axis on account of tolerances of this kind and yet snug abutment at the stop bead 42 is guaranteed on account of the floating mounting of the stop sleeve 50 relative to the force input member 16.

FIG. 1 also shows that the force input member 16 has at its left-hand end a rounded pin 54 which projects into a partly conically stepped recess 56 in the transmission piston 14 and lies workingly against the latter's tapering left-hand end. The transmission piston 14 is also provided at its end which is on the left in FIG. 1 with a shaft portion 58, with which it interacts via a transmission member 60, which is merely indicated. This is guided in the master brake cylinder housing 12 and performs the same functions as already described in the prior art according to DE 10 2006 012 223 B3.

Furthermore, an all-round edge portion 64 provided with openings 62 is provided on the transmission piston 14, which portion is guided in a sealing manner in the master brake cylinder housing 12 via a lip seal. This portion projects into a pedal counterforce simulator chamber 68 which is completely filled with a hydraulic fluid and acts like a conventional simulation chamber. Disposed to the right of the simulation chamber 68 is an annular fluid chamber 70 which is sealed relative to the fluid chamber 68 by way of the lip seal 66 and sealed to the right in FIG. 1 via a further lip seal 72 which is accommodated in the master brake cylinder housing 12. The pedal counterforce simulation device, which is active from the chambers 68, 70 through the intermediary of the radial openings 62 in the edge 64 and through the intermediary of further hydraulic or pneumatic components, which are not shown, functions in a way which is conventional per se. In this connection the chamber 68 is provided with an outlet bore, which is not shown and via which a hydraulic connection to a counterforce simulation device is provided. A pedal counterforce can be "artificially" generated with this.

It is understood that the simulation chamber 68 is also sealed to the left via a sealing element 74 in FIG. 1.

Through the arrangement of the adapter 18, contact sleeve 34 and stop sleeve 50, the force input member can be fitted to the master brake cylinder housing 12 in a simpler, more space-saving manner and, in particular, with the possibility of compensating for manufacturing and positional tolerances. The floating mounting of the stop sleeve 50 on the force input member 16 ensures that the stop sleeve 50 lies snugly with its stop collar 52 against the contact sleeve 34 and thus no localised wear phenomena can occur, although the force input member 16 does not necessarily have to be positioned coaxially with the longitudinal axis A. A space-saving and efficient arrangement of the components is in particular obtained.

Figure 2:
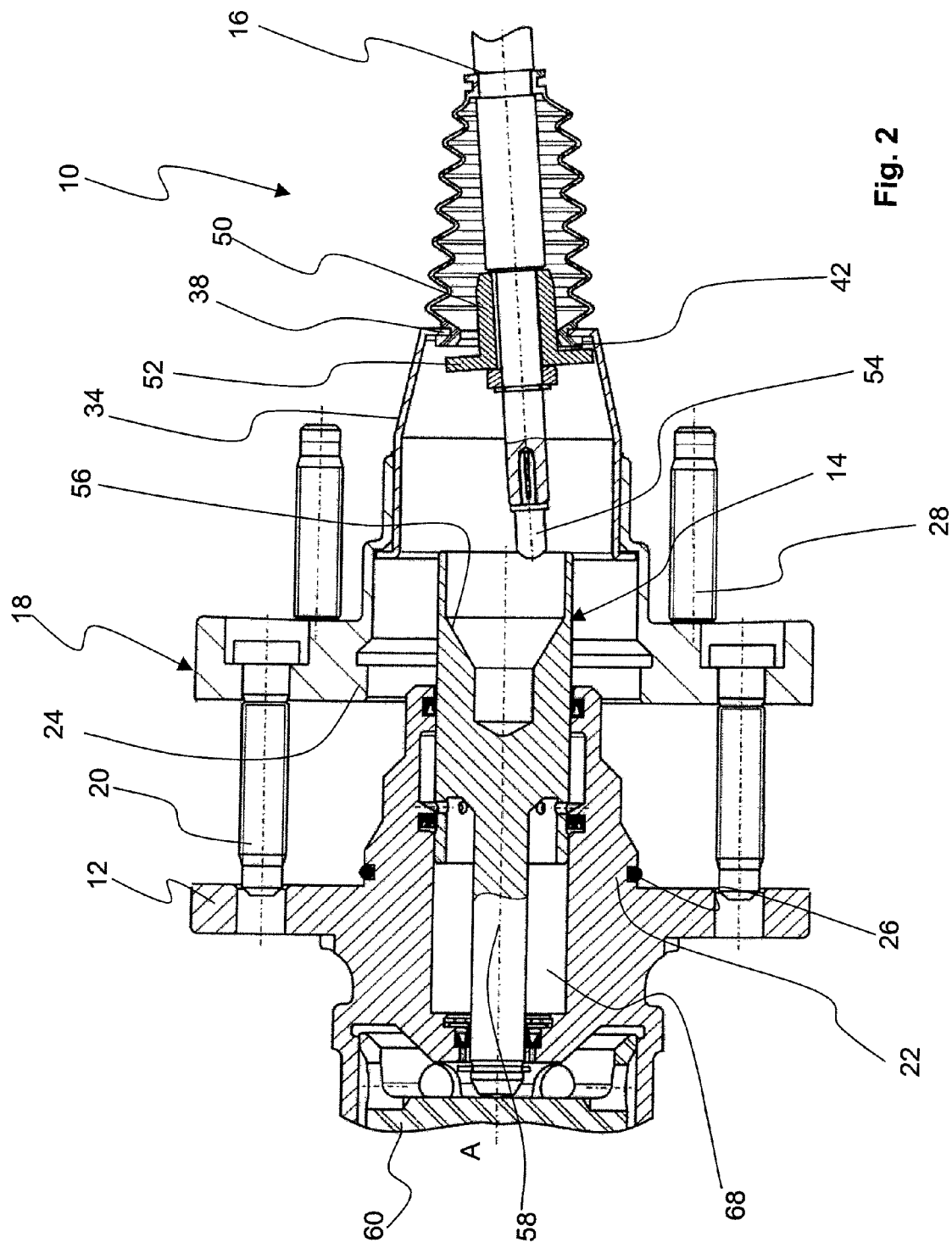
FIG. 2 is a view which serves to illustrate the assembly of the first embodiment.

FIG. 2 shows an assembly situation of the embodiment according to FIG. 1. In this connection the adapter 18, together with the contact sleeve 34 and the force input member 16, which is inserted in these components and is in an oblique position required for assembly, is fitted to the firewall, which is not shown, of the motor vehicle via the bolts 28. The master brake cylinder housing 12 is then placed on the bolts 20 and pushed into the adapter 18, while the transmission piston 14 enters the adapter 18. On account of the recess 56 being formed conically stepwise, the free end 54 of the force input member 16 is securely accommodated in the transmission piston 14. The master brake cylinder housing 12 is pushed into the adapter 18 until the positioning portion 22 lies in a sealing manner and snugly with its seal 26 in the corresponding positioning portion 24 of the adapter 18, as shown in FIG. 1. The force input member 54 is then placed securely in position due to the conicities in the stepped recess 56. Manufacturing and positional tolerances are automatically compensated via the stop sleeve 50 mounted in a floating manner.

It is obvious that the assembly of this arrangement can be carried out in a relatively simple manner and with a low susceptibility to error.

Figure 3:
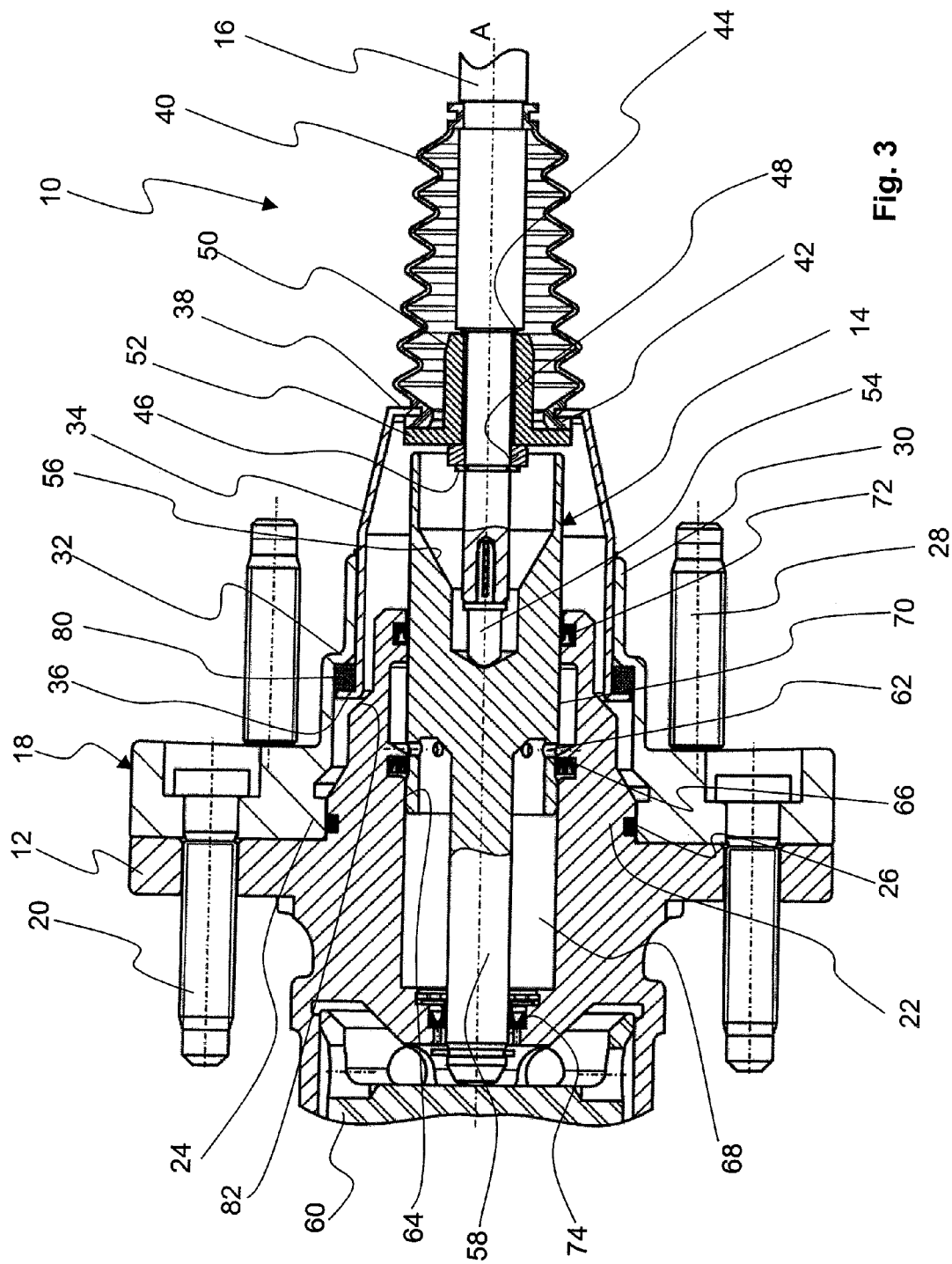
FIG. 3 is an axis-containing longitudinal sectional view corresponding to FIG. 1 according to a slightly modified second embodiment.

FIG. 3 now shows a second constructional variant of the invention, which only differs from the first constructional variant according to FIG. 1 in that a damping element 80 is provided between the abutment shoulder 32 of the sleeve extension 30 and the abutment collar 36, which projects radially outwards, of the contact sleeve 34. The damping element 80 acts, just as the abutment bead 42, in a damping manner with respect to occurring abutment noises and impacts when the force input member 16 is applied to the contact collar 38 following actuation upon returning to the starting position which is shown in FIG. 3. The contact sleeve 34 is then accommodated in a displaceable manner in the adapter 18, so that the damping element 80 is to a certain extent compressed by a telescopic movement of the contact sleeve 34 in the adapter 18. However this displaceability is limited to the left in FIG. 3 by a conical portion 82, which is in a defined location in the assembled state according to FIG. 3, at the master brake cylinder housing 12, so that no undesirable incorrect positioning can occur.

Otherwise the embodiment according to FIG. 3 functions exactly as described in detail above in relation to FIG. 1.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. Master brake cylinder arrangement of a motor vehicle brake system with a master brake cylinder housing, a transmission piston disposed in a displaceable manner in the master brake cylinder housing, and a force input member which can be workingly coupled to the transmission piston in order to introduce a braking force, wherein an adapter is coupled to the master brake cylinder housing, to which adapter a contact sleeve is fitted, wherein the force input member is supported at the contact sleeve in a non-actuated starting position.

2. Master brake cylinder arrangement according to claim 1, wherein the adapter can be positioned via a positioning portion in a predetermined desired position relative to the master brake cylinder housing.

3. Master brake cylinder arrangement according to claim 1, wherein the adapter has a stepped sleeve extension with an abutment shoulder which can be brought into engagement with a correspondingly formed abutment collar on the contact sleeve.

4. Master brake cylinder arrangement according to claim 3, wherein a damping element is disposed between the abutment shoulder and the abutment collar.

5. Master brake cylinder arrangement according to claim 1, wherein the contact sleeve has a contact collar which offers a stop face for the force input member in the non-actuated starting position.

6. Master brake cylinder arrangement according to claim 5, wherein the contact collar is embraced by an elastomeric stop bead.

7. Master brake cylinder arrangement according to claim 1, wherein a stop sleeve with a stop collar is fitted to the force input member.

8. Master brake cylinder arrangement according to claim 7, wherein the stop sleeve is fitted to the force input member with radial or/and axial play.

9. Master brake cylinder arrangement according to claim 8, wherein at least one of the radial and axial play is dimensioned such that a tolerance-induced or assembly-induced oblique position of the force input member can be compensated.

10. Master brake cylinder arrangement according to claim 7, wherein the force input member has a shoulder and a stop ring, between which the stop sleeve is accommodated.

11. Master brake cylinder arrangement according to claim 1, wherein the transmission piston has a receiving opening which is of conical formation at least in portions and into which a free end of the force input member projects.

12. Master brake cylinder arrangement according to claim 1, wherein the transmission piston extends through a pedal counterforce simulation chamber which is formed in the master brake cylinder housing and is guided in this chamber in a sealing manner.

* * * * *